United States Patent Office 3,487,238
Patented Dec. 30, 1969

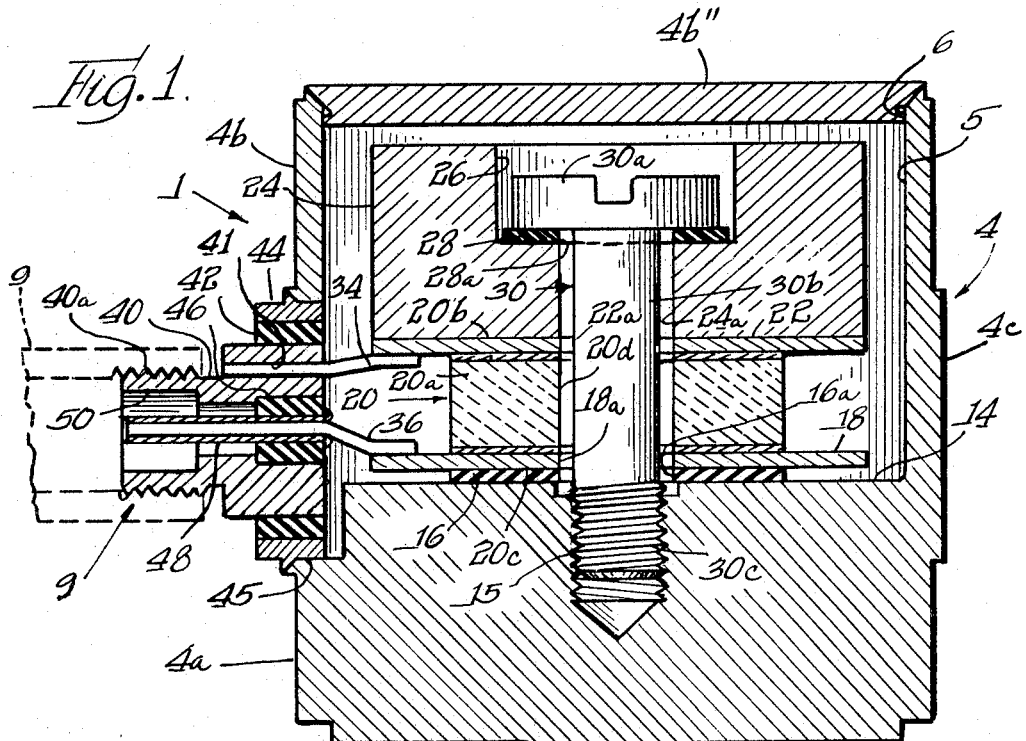
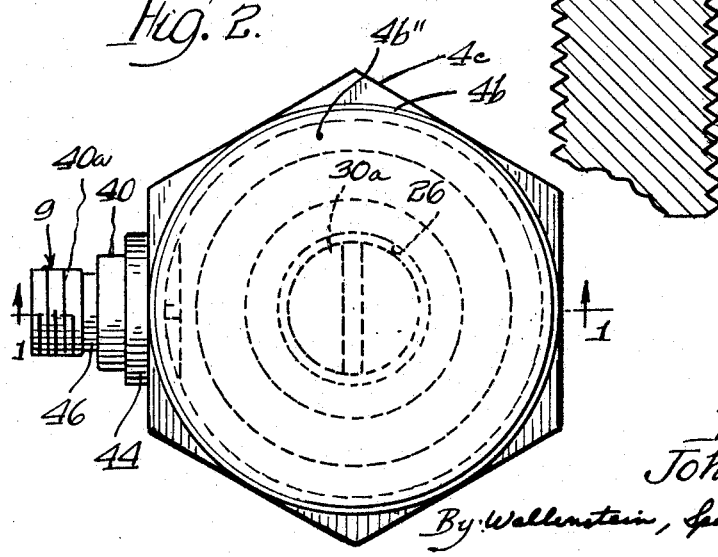

3,487,238
CERAMIC TRANSDUCER ELEMENTS AND
ACCELEROMETERS UTILIZING SAME
Paul A. Angleton, Duarte, and John R. Hayer, Placentia,
Calif., assignors, by mesne assignments, to Gulton Industries, Inc., Metuchen, N.J., a corporation of
Delaware
Filed July 27, 1967, Ser. No. 656,558
Int. Cl. H02n 7/00
U.S. Cl. 310—8.4                                         3 Claims

ABSTRACT OF THE DISCLOSURE

A compression-type accelerometer comprising piezoelectric means sandwiched between a pair of members one of which forms a base for the accelerometer and the other which forms a vibratable mass therefor. Clamping means forces the members toward one another to apply a fixed pre-compression to the piezoelectric means to provide a desired sensitivity, the clamping means having a coefficient of expansion which is complementary to that of the significantly expanding and contracting portions of the accelerometer between said members including said piezoelectric means, so the pre-compression on the piezoelectric means remains relatively constant over a wide temperature range. The clamping means most advantageously is a screw which has a head bearing against one of said members and a shank threading into the other of same.

---

The present invention relates to compression-type accelerometers which are to be subjected to very wide temperature fluctuations. A specific aspect of the invention is based on the discovery that certain piezoelectric ceramics, when polarized with direct current, possess unusual characteristics, notably extreemly high Curie temperatures, when adapt them for use at very high tempreatures where the accelerometer can be theoretically useful over a very wide temperature range as, for example, at temperatures from —300° F. and even considerably below to as high as about 1100° F. These piezoelectric ceramics are sensitive preferably only in the compression mode ($d33$) so they are sensitive only to shock or vibratory acceleration and give little or no spurious outputs due to other forces acting on the transducers such as acoustic pressure, hydrostatic pressure, case bending, etc.

Compression-type accelerometers are usually placed under a predetermined initial compression to obtain a maximum linear sensitivity. The one or more piezoelectric elements of the accelerometer are normally sandwiched between a pair of members, one of which may be a base portion of the accelerometer and the other of which may be a vibratable mass. Pressure may be applied to the piezoelectric elements by a clamping screw which has a head portion which bears against the vibratable mass and threads into the base member. It has been discovered that when the accelerometer is subjected to a very large range of temperatures, such as one including many hundreds of degrees, the expansion and contraction of the clamping screw can materially vary the pre-compression on the piezoelectric element to materially vary the sensitivity thereof, making the signals delivered by the accelerometer erroneous indications of the accelerations involved.

In accordance with a general aspect of the invention, the material out of which the clamping screw or other clamping means is made is carefully selected so that its coefficient of expansion is complementary to the effective coefficient of expansion of the portions of the accelerometer significantly affected by the temperature variations involved, namely the piezoelectric elements, the vibratable mass and various insulating and electrode-forming members forming part of the piezoelectric element sandwich.

The piezoelectric elements of the accelerometer are made from ceramic compositions which, in their especially advantageous form, can be represented by the following formula:

(I) $n(Na_{0.5}Bi_{4.5}Ti_{4.0}O_{15})$ where $n$ is an integer. In its broader but, generally, distinctly less preferred form, said compositions can be represented by the following formula:

(II) $n(M_{0.5}Bi_{4.5}E_{4.0}O_{15})$ where $n$ is an integer; M is, in addition to Na, Li or K, or mixtures any two or more thereof; and E is, in addition to Ti, Zr or mixtures of Ti and Zr.

As illustrative of the preparation of the particularly preferred ceramic transducer piezoelectric compositions and elements of the present invention, the following example is given.

EXAMPLE (A) Reagent grade $Na_2CO_3$, reagent grade $Bi_2O_3$ and SD Grade $TiO_2$, in stoichiometric proportions, are wet-mixed in a ball mill, the mix is dried and calcined (pre-reacted) in alumina saggers at about 1650° F. for two hours. The resulting calcined material is then ground in a ball mill to approximately 1.5 micron particle size (as measured on a Fisher sub-sieve sizer). The material is then dried and prepared, by conventional techniques, in slip form for casting, or mixed with usual binders, such as polyvinyl alcohol, and granulated for dry pressing.

(B) Slugs are cast from the prepared slip of appropriate diameter and shape for the intended transducer of piezoelectric usage, for instance, in a compression accelerometer. The slugs are dried and then bisque fired to burn out all organic constituents used in preparing the slip. The bisque fired slugs are then machined to the correct shape and size taking into account the shrinkage factor in the subsequent sintering procedure. The machined slugs are sintered at about 2000° F. for about two hours in closed Erabase saggers on thin platinum sheets to minimize contamination due to reaction with adjacent material. The sintered slugs are sliced and lapped to the required thickness. Gold or equivalent electrodes are applied on the flats using vacuum deposition techniques.

The electroded elements are polarized, for instance, at about 350–430° F. in Dow-Corning Silicone Fluid F–1–0173 for about 15 minutes at 100–150 volts/mil D.C. The elements are carefully cleaned by immersion in perchlorethylene and stored until ready for use. The resulting piezoelectric elements have a Curie temperature of about 1200° F.

Transducer of piezoelectric elements made in accordance with the particularly preferred embodiment of the present invention operate effectively over prolonged periods of time over an extremely wide range of temperatures, more specifically, at temperatures from —300° F. and even considerably below to as high as about 1100° F. Such elements are sensitive only in the compression mode ($d33$) and, therefore, compression transducers made with such elements are sensitive only to shock or vibratory acceleration and give little or no spurious outputs due to other forces acting on the transducers such as acoustic pressure, hydrostatic pressure, case bending, etc.

In the drawing, there is shown one particular exemplary compression-type accelerometer and wherein:

FIG. 1 is a vertical sectional view, in essentially schematic form, of the accelerometer;

FIG. 2 is a plan view thereof;

Figure 3:
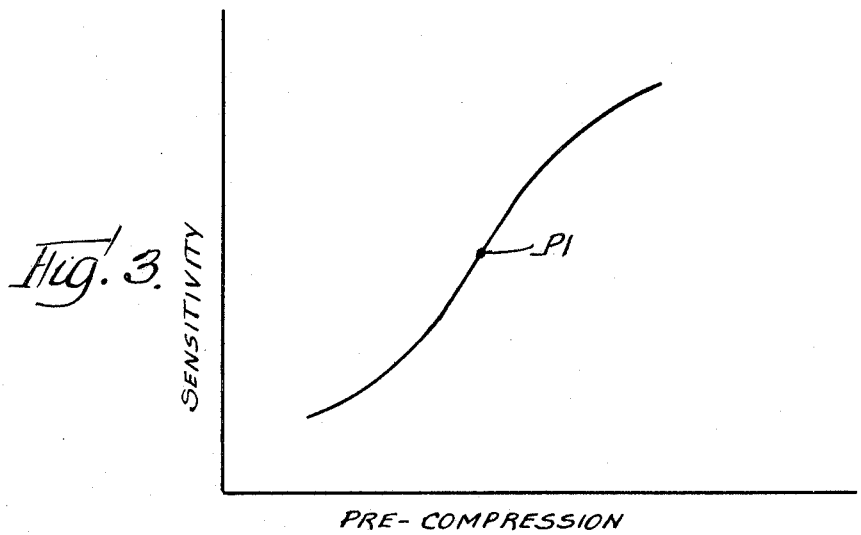
FIG. 3 is a curve showing the typical variation in sensitivity of an accelerometer like that shown in FIGS. 1 and 2 with the pre-compression applied to the piezoelectric portion thereof.

Referring now to FIGS. 1 and 2, the accelerometer 1 there shown comprises a housing 4 having a cylindrical base portion 4a, a cylindrical head portion 4b and a hexagonal intermediate portion 4c. The housing has a compartment 5 therein with an initial opening 6 at the top thereof which, before completion of the assembly of the accelerometer, provides access to the compartment 5 for insertion of various components of the accelerometer to be described. The compartment is finally closed by a cap 4b" which is welded to the upper margins of the side walls.

Extending axially downwardly from the base portion 4a of the housing 4 is a cylindrical neck 7 which is threaded at the bottom thereof as shown at 8 to enable the housing to be anchored to a test body. The housing 4 is preferably made of metal, preferably stainless steel. Projecting laterally from the base portion 4a of the housing is a male connector assembly 9 which is more or less of conventional construction and adapted to receive a female co-axial cable connector assembly 9' shown in dashed lines.

The compartment 5 has a flat inner wall surface 14 against which the various accelerometer-forming components to be described are supported. Formed in the center of the wall surface 14 is a threaded hole 15, and an annular insulating disc 16 with a central hole 16a is supported against the wall surface 14 with the hole 16a aligned with the threaded hole 15. A contact plate 18 bears upon the insulating disc 16, the contact plate having a central opening 18a aligned with the holes 16a and 15. One or more stacked piezoelectric elements 20 made of the above described ceramic material are positioned against the contact plate 18. The one or more piezoelectric elements 20 include one or more bodies 20a of piezoelectric material with outmost electrode coatings 20b and 20c, the electrode 20b engaging the contact plate 18 and the electrode coating 20c contacting a conductor plate 22 similar to the plate 18. The contact plates 18 and 22 and the one or more piezoelectric elements 20 are provided with centered openings 18a, 22a and 20d which are aligned with the aforementioned holes or openings 16a and 18a.

Supported against the outer side of the contact plate 22 is a vibratable mass 24 which has an outer centered recess 26. The recess 26 receives the head portion 30a of a clamping screw 30 which bears against an insulating ring 28. The clamping screw 30 has a shank 30b which passes through the aligned centered holes 28a and 24a in the insulating ring 28 and the vibratable mass 24 and through the aforesaid openings 22a, 20d, 19a and 16a and threads into the threaded hole 15 formed in the housing base 4a.

Figure 4:
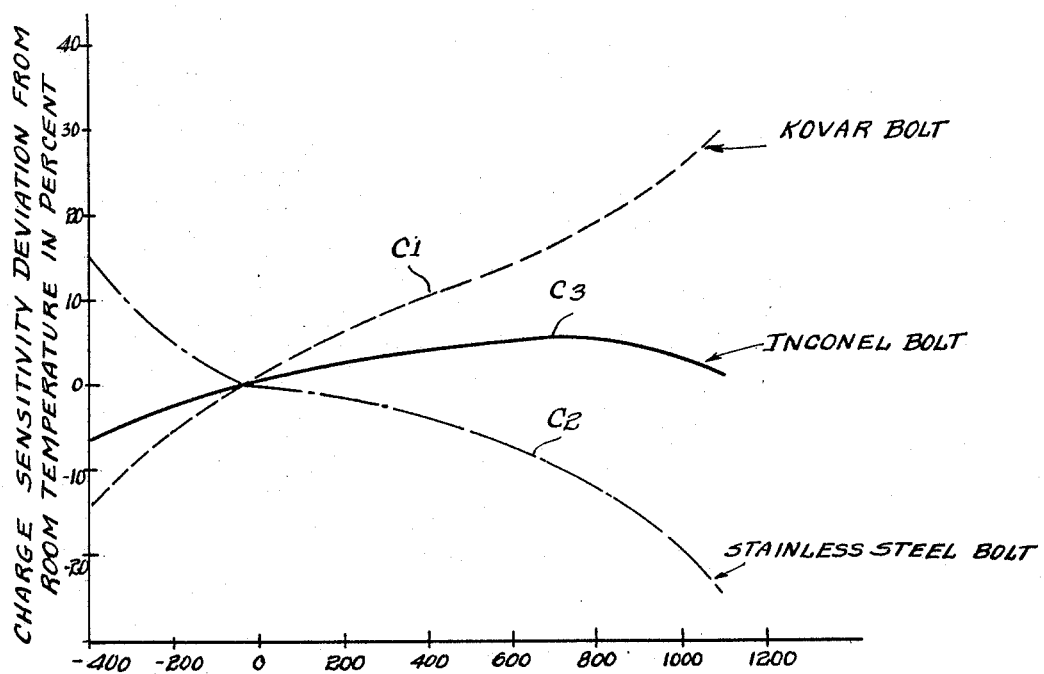
FIG. 4 is a set of curves comparing the variation in the pre-compression with temperature of the accelerometer of FIGS. 1 and 2 with accelerometers of the prior art.

The clamping screw 30 is tightened to provide the desired pre-compression on the piezoelectric element or elements 20 to provide the proper operating point therefor. Thus, as shown in FIG. 3, the desired operating point P1 of the pre-compression sensitivity curve there shown is the point of maximum linearity of the piezoelectric material involved. Generally, this point is found empirically. However, once the desired pre-compression of the piezoelectric elements 20 is found, and the accelerometer is calibrated at this pre-compression, it is important that this pre-compression remain relatively constant over the entire range of temperatures to which the accelerometer is to be subjected. With accelerometer constructions in accordance with the prior art, the amount of pre-compression applied to the piezoelectric elements of the compression-type accelerometers would vary over wide limits if the accelerometer were to be subjected to a temperature range of many hundreds of degrees. Curves C1–C2 in FIG. 4 illustrate the manner in which the sensitivity of conventional type accelerometers vary with temperature and the curve C3 illustrates the same curve for the accelerometer of the invention.

One aspect of the invention is in selecting the material out of which the clamping screw 30 is made so the material has a coefficient of expansion which is complementary to the overall coefficient of expansion of those portions of the accelerometer between the head portion 30a of the clamping screw and the housing base 4 which expand significantly over the temperature ranges involved. It was discovered that cast Inconel, a trademark of the International Nickel Company (see p. 203, Handbook of Material Trade Names by Zimmerman and Lavine for composition details), was found especially satisfactory for an accelerometer having the following specifications:

insulating ring 28 (steatite)—outer diameter .34"; inner diameter .17"; and thickness .02";
vibratable mass 24 (sintered tungsten, Kennertium W–2 of Kennametal Co. of Latrobe, Pa.)—outer diameter .75"; diameter of recess 26—.35"; depth of recess 26—.15"; and thickness of mass 24—.30"
piezoelectric elements 20—outer diameter .50"; inner diameter .18"; and total thickness .15";
contact plates 18 and 22—(stainless steel)—outer diameter .75"; inner diameter .186"; and thickness .020";
insulating disc 16 (steatite)—outer diameter .50"; inner diameter .17"; and thickness .020".

The Inconel screw 30 used with the accelerometer described has a coefficient of expansion of $8 \times 10^{-6}$ in./in./° F., has a head diameter of .315", a thickness of .08", a shank length of .39", a major thread diameter of between .1571"–.1631", a minor thread diameter of .1248", and a thread length of .15".

The piezoelectric element or elements 20 may comprise a series of individual piezoelectric discs each with electrodes on the opposite ends thereof connected in series or parallel, depending upon the application of the accelerometer. In any event, the resultant output of the piezoelectric electrode sandwich will appear across the outermost electrodes 20b and 20c which are in conductive contact with the contact plates 18 and 22. Conductive leads 34 and 36 are soldered or otherwise secured to the contact plates 18 and 22 and extend respectively into the connector assembly 9. The connector assembly 9 includes a cylindrical metal sleeve 40 which is threaded at the outer end 40a thereof so as to receive a securing nut at the end of the co-axial cable 9' to be connected thereto. The conductor lead 34 extends into an opening 41 in the sleeve 40 and make electrical contact therewith. The sleeve 40 is surrounded by an insulating ring 42 which in turn is fitted closely within an outer sleeve 44 which is welded to the defining walls of a lateral opening 45 formed in the housing 4.

The conductor lead 36 extends into a hollow metal pin 48 extending centrally into connector assembly 9. The hollow metal pin 48 fits within a socket in the co-axial cable 9'. The hollow metal pin is supported an insulated from the sleeve 40 by an insulating sleeve 46 extending between the sleeve 40 and the hollow metal pin 48.

While there has been shown the present best embodiment of the invention, both in relation to the ceramic transducer compositions and elements and the use thereof in a compression-type transducer, it will be understood that various changes and modifications can be made in the light of the guiding principles and teaching set forth herein without departing from the invention.

We claim:
1. A compression-type accelerometer comprising piezoelectric means sandwiched between a pair of members one of which forms a base for the accelerometer and the other which forms a vibratable mass therefor, a screw made of Inconel for forcing said members toward one another to apply a fixed pre-compression to said piezoelectric means to provide a desired sensitivity, said screw having a head bearing against one of said members and a shank threading into the other of same and having a coefficient of expansion which for the co-figuration of the screw is selected to provide a similar degree of expansion and contraction to that of the significantly expanding and contracting portions of the accelerometer between said members including said piezoelectric means over at least a 1000° F. wide temperature range, so the pre-compression of the piezoelectric means remains relatively constant thereover.

2. The accelerometer of claim 1 wherein said piezoelectric means is a composition corresponding to the formula $$n(M_{0.5}Bi_{4.5}E_{4.0}O_{15})$$

where $n$ is an integer; M is one or more of Na, Li and K; and E is one or more of Ti and Zr.

3. The accelerometer of claim 1 wherein said piezoelectric means is a composition corresponding to the formula $$n(M_{0.5}Bi_{4.5}E_{4.0}O_{15})$$

where $n$ is an integer.

References Cited

UNITED STATES PATENTS

| | | | |
|---|---|---|---|
| 3,429,031 | 7/1969 | Kistler | 310—807 |
| 3,388,001 | 6/1968 | Glencoe | 117—213 |
| 3,437,849 | 4/1969 | Treatch | 310—8.1 |

J. D. MILLER, Primary Examiner

U.S. Cl. X.R.

310—8.7, 8.9, 9.1